United States Patent [19]

Hedeen et al.

[11] 4,165,119

[45] Aug. 21, 1979

[54] WINDOW REVEAL MOLDING

[75] Inventors: Carl E. Hedeen, Grosse Pointe Shores; Richard D. Loose, Birmingham, both of Mich.

[73] Assignee: General Motors Corporation, Detroit, Mich.

[21] Appl. No.: 854,142

[22] Filed: Nov. 23, 1977

[51] Int. Cl.$^2$ .............................................. B60J 1/02
[52] U.S. Cl. ......................................... 296/93; 52/400
[58] Field of Search .................... 296/93; 49/486, 488, 49/498, 489, 500; 52/400, 403, 716, 717

[56] References Cited

U.S. PATENT DOCUMENTS

| | | | |
|---|---|---|---|
| 2,214,222 | 9/1940 | Chaffee | 296/93 UX |
| 2,705,820 | 4/1955 | Torrence | 296/93 UX |
| 3,378,958 | 4/1968 | Parks et al. | 49/489 |
| 3,851,432 | 12/1974 | Griffin | 52/400 |
| 4,035,017 | 7/1977 | Griffin et al. | 296/93 |

FOREIGN PATENT DOCUMENTS 1801148  4/1978  Fed. Rep. of Germany ............. 52/403

Primary Examiner—Richard A. Bertsch
Assistant Examiner—Gene A. Church
Attorney, Agent, or Firm—Charles E. Leahy

[57] ABSTRACT

An extruded resilient plastic reveal molding for a vehicle body window installation has a decorative trim portion adapted to bridge the space between the window panel and the body in overlying engagement therewith. The molding has a stem extruded integral with the decorative trim portion and extending generally normal therefrom for insertion into the space between the window panel and the body panel. A bulbous enlargement at the distal end of the stem projects into the adhesive for embedment therein upon curing of the adhesive. A plurality of retrorse fins extend outwardly from both sides of the stem and are angled toward the decorative trim portion for respective engagement with the edge of the window panel and the body panel flange to resiliently and yieldably center the stem therebetween. The stem and flange yield to permit tilting of the decorative trim portion into overlying engagement with the window panel and body panel when the window panel is mounted in a plane offset from the plane of the body panel. The fins on each side of the stem provide serially arranged dams and reservoirs to prevent overflow of adhesive onto the molding and the panels.

1 Claim, 4 Drawing Figures

WINDOW REVEAL MOLDING

The invention relates to a window reveal molding for a motor vehicle body and more particularly to a decorative molding for concealing a space between an adhesively secured window panel and a vehicle body panel.

It is known to conceal the space between a window panel and a vehicle body panel by use of a metal molding which bridges the space and is attached to the vehicle body by a plurality of clips spaced along the length of the molding and engaged upon studs welded to the body panel.

It is also known to provide a plastic extruded molding having a decorative portion which overlies the window panel and the body panel and has continuously extruded legs which are inserted into the bead of curable adhesive to attach the molding to the body panel.

According to the present invention a new and improved plastic reveal molding has a resiliently yieldable stem extruded integral with the decorative trim portion and extending generally normal therefrom for insertion into the space between the window panel and the body panel. A bulbous enlargement is integral with the stem at the distal end thereof and is adapted to project into the adhesive for embedment therein upon curing of the adhesive. A plurality of resiliently yieldable retrorse fins extend outwardly from both sides of the stem and are angled toward the decorative trim portion. The fins are adapted for respective engagement with the edge of the window panel and the body panel flange to resiliently and yieldably center the stem between the window panel and the body panel flange. The stem and fins yield as necessary to permit tilting of the decorative trim portion into overlying engagement with the window panel and body panel when the window panel is mounted in a plane offset from the plane of the body panel. The fins on each side of the stem provide serially arranged dams to impede flow of adhesive onto the molding and the panels upon insertion of the molding into the adhesive and the resulting displacement of adhesive. Each successive pair of fins cooperates with the stem and the respectively engaged panel to provide a reservoir for capture of adhesive overflowing the terminal fin of such successive pair to further prevent flow of adhesive onto the molding and the panels.

One object, feature and advantage of the invention is the provision of a molding structure having a yieldable stem and fins which accommodate variation in the spacing between the edge of the window panel and the edge of the vehicle body flange.

Another object, feature and advantage of the invention is the provision of a molding having a yieldable structure by which the decorative trim portion may be positioned in overlying engagement with the window panel and the body panel irrespective of mounting of the window panel in a plane disparate from the plane of the body panel.

A still further object, feature and advantage of the invention resides in the provision of a molding having a stem with a plurality of retrorse fins thereon defining serially arranged dams and reservoirs cooperating to prevent overflow of adhesive onto the window panel and body panel.

These and other objects, features and advantages of the invention will become apparent upon consideration of the specification and the appended drawings in which.

Figure 1:
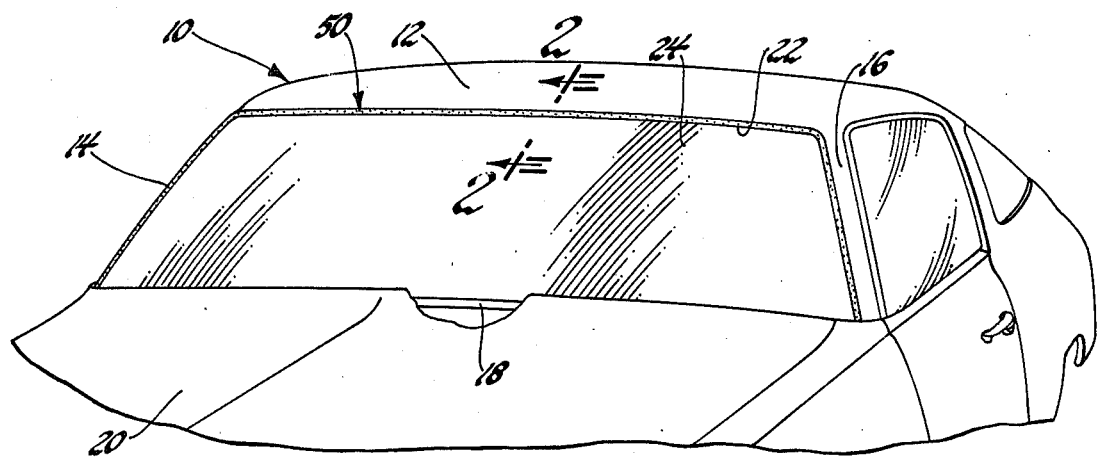
FIG. 1 is a partial front perspective view of a vehicle body having a window molding according to the invention.

Referring to the drawings, a vehicle body 10 includes a conventional roof structure 12, roof pillars 14 and 16, and a cowl structure 18 concealed beneath the hood 20, which cooperate to define a conventional window opening 22 which is closed by a fixed window panel or windshield glass 24.

Figure 2:
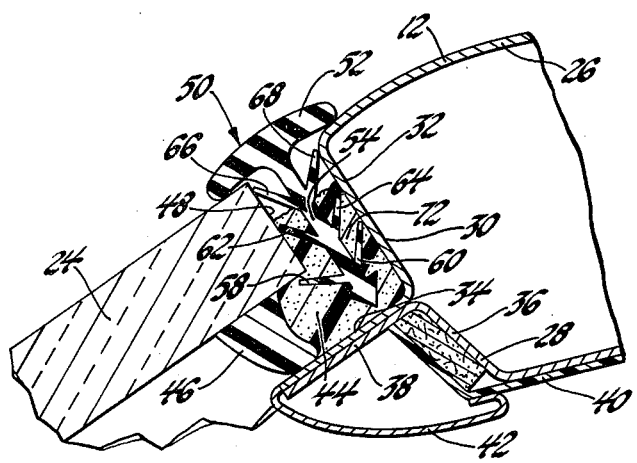
FIG. 2 is a cross-sectional view taken in the direction of arrows 2—2 of FIG. 1.

Referring to FIG. 2, it will be seen that the roof structure 12 includes an outer panel 26 and an inner panel 28. The outer panel 26 includes an inwardly offset flange structure 30 including an inwardly extending wall 32 which is perpendicular to the surface of the outer panel 26 and a parallel extending wall 34 which extends generally forwardly and parallel to the window panel 24 and the surface of the outer panel 26. The roof inner panel 28 has similar walls 36 and 38. The walls 34 and 38 are abutting and are pinch welded together. A fabric headlining 40 is attached to the roof inner panel 28 and has its attached edge concealed by a garnish molding 42. The roof pillars 14 and 16 each have conventional inwardly offset flanges similar to those of the roof structure 12 and cooperate therewith to provide the flanged window opening 22.

The window panel 24 is mounted in the window opening 22 by a bead of curable adhesive material 44 which is applied along the perimeter of the window panel 24 or in the alternative along the flange of window opening 22 so that it forms a bond between the window panel 24 and flange structure 30 when the window panel is installed in the window opening. A flexible rubber dam 46 is interposed between the window panel 24 and parallel extending wall 34 to confine the bead of curable adhesive 44.

The bead of curable adhesive 44 is preferably a polysulfide based material having suitable fillers and solvents sulfide based material having suitable fillers and solvents added thereto. When cured, this material exhibits the properties of rubber in that it is capable of accepting shear stress, will not crack or corrode in various climates, and will wet both glass and painted metal to assure a continuous bond between the body flange and the window panel. When the window panel 24 is located centrally in the flanged window opening 22, a space of about two to five millimeters remains between the edge wall 48 of the window panel 24 and the inwardly extending wall 32 of the flange structure 30. The bead of curable adhesive 44 rises in this space when the window panel 22 is pushed toward the parallel extending wall 34 of flange structure 30.

Figure 4:
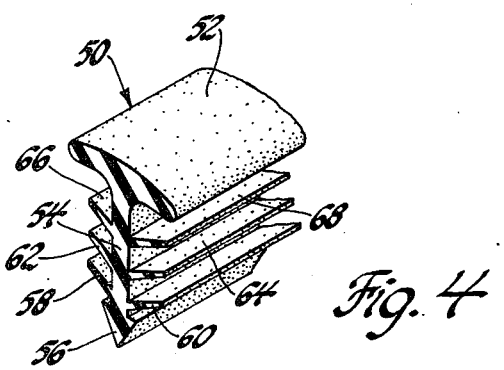
FIG. 4 is a perspective view showing the reveal molding.

As best seen in FIGS. 2 and 4, a reveal molding 50 of extruded plastic has a decorative trim portion 52 about seven millimeters in width for overlying both the window panel 24 and the outer panel 26. The decorative trim portion 52 may have a strip of bright mylar mounted thereon to provide a chrome visual effect or the molding 50 may be fashioned from a colored plastic which would provide a desired match or contrast with the color of the vehicle body paint.

Molding 50 has a resiliently yieldable stem 54 which extends generally normally therefrom and has an integral arrowhead-shaped bulbous enlargement 56 at the distal end thereof. A plurality of resiliently yieldable retrorse fins 58, 60, 62, 64, 66, and 68 extend outwardly in opposing matched pairs from both sides of the stem 54 and are angled back toward the decorative trim portion 52. As seen in FIG. 4, the cross section of the molding 50 is made continuous by the extrusion process.

Referring to FIG. 2, it is seen that the molding 50 is assembled to the vehicle body by being thrust into the space between the edge wall 48 of window panel 24 and the inwardly extending wall 32 prior to curing of the bead of curable adhesive 44. Upon entry, the retrorse fins yield to the extent necessary to fit between the edge wall 48 and the inwardly extending wall 32. During such insertion of the molding 50 into the bead of curable adhesive the fins wipe against the edge 48 and the wall 32 to center the molding therebetween and prevent tipping of the molding. Upon curing of the adhesive the bulbous enlargement 56 becomes mechanically embedded in the bead of curable adhesive 44 to capture the molding 50 against removal. As seen in FIG. 2, the length of stem 54 and the spacing and number of the fins thereon may result in the terminalmost fin 58 being inserted to a point beyond engagement with the edge wall 48 of window panel 24 in which case the fin 58 is likewise embedded in the bead of curable adhesive 44.

Furthermore, the fins act as serially arranged dams which impede flow of adhesive in the direction which would overflow onto the window panel 24 or outer panel 26. The fins also cooperate with the stem 54 and the respectively engaged window panel 24 or wall 32 to provide a reservoir for capture of adhesive overflowing the preceding fin to thereby prevent flow of adhesive onto the panels 24 and 26. For example, the adjacent fins 60 and 64 cooperate with the inwardly extending wall 32 and the stem 54 to define a reservoir 72 which extends around the window opening 22 to channel overflow along the molding. The adhesive that overflows fin 64 is likewise received by the reservoir formed between fins 60 and 64.

Figure 3:
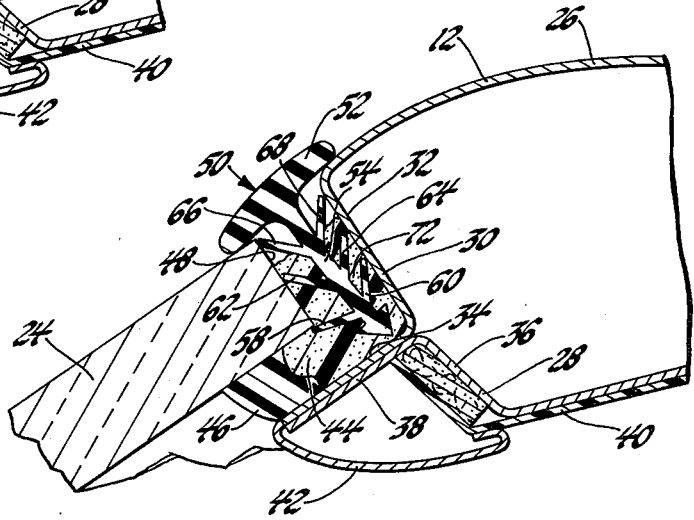
FIG. 3 is a view similar to FIG. 2 but showing the window panel mounted in a plane inwardly offset from the plane of the body panel.

Referring to FIG. 3, it is seen that the molding 50 will accommodate mounting of the window panel 24 in a plane disparate from the plane of the outer panel 26. For example, as shown in FIG. 3, the window panel 24 may be pressed more closely to the parallel extending wall 34 so that the planar surface of the window panel 24 is inwardly the planar surface of the outer panel 26. The installation of the decorative trim portion 52 into overlying engagement with the surface of window panel 24 and outer panel 25 is accommodated by yielding of the stem 54 at its juncture with the decorative trim portion 52 and also by variable yielding of the fins 60, 64, and 68 more than the fins 58, 62, and 66 so that the stem 54 is canted somewhat relative the edge wall 48 of the window panel 24 and the inwardly extending wall 32 of flange 30 and extends closer to the wall 32 than to the edge wall 48.

Thus, it is seen that the invention provides a new and improved window reveal molding having a yieldable structure for accommodating offsets in the plane of the glass from the plane of the body panel as well as varying widths of spacings remaining between the edge of the window panel and the vehicle body mounting flange.

The embodiments of the invention in which an exclusive property or privilege is claimed are defined as follows:

1. In a motor vehicle body, a molding for concealing the space between a flange body panel and the edge of a window panel mounted on the body panel flange by a curable adhesive, said molding comprising:

a decorative trim portion adapted to bridge the space between the window panel and the body panel in overlying engagement therewith;

a resiliently yieldable stem extruded integral with the decorative trim portion and extending generally normal therefrom for insertion into the space between the window panel and body panel;

a bulbous enlargement integral with the stem at the free end thereof and adapted to project into the curable adhesive to attach the molding to the vehicle body;

a plurality of resiliently yieldable retrorse fins extending outwardly from both sides of the stem and angled toward the decorative trim portion, said fins being adapted for respective engagement with the edge of the window panel and the body panel flange to resiliently and yieldably center the stem between the window panel and the body panel flange, said resiliently yieldable stem and fins cooperating to permit tilting of the decorative trim portion into overlying engagement with the window panel and body panel irrespective of the mounting of the window panel in a plane disparate from the body panel, the fins on each side of the stem providing serially arranged dams, each successive pair of such fins cooperating with the stem and the respectively engaged panel to provide a reservoir for capture of adhesive overflowing the terminal fin of such successive pair to thereby prevent flow of the adhesive onto the molding and the panels upon insertion of the bulbous enlargement of the stem into the adhesive and displacement of such adhesive into the space between the panels.

* * * * *